July 20, 1965     D. J. HOPKINS     3,195,773

ARTICLE HANDLING APPARATUS

Filed April 8, 1964

INVENTOR.
Durwood J. Hopkins

BY *Clarence R Patty*

ATTORNEY

United States Patent Office 3,195,773
Patented July 20, 1965

3,195,773
ARTICLE HANDLING APPARATUS
Durwood J. Hopkins, Corning, N.Y., assignor to Corning Glass Works, Corning, N.Y., a corporation of New York
Filed Apr. 8, 1964, Ser. No. 358,178
8 Claims. (Cl. 221—212)

This invention relates to article handling apparatus, and particularly to apparatus for handling metallic members or pins which have relatively small dimensions and which are, therefore, relatively difficult to handle manually. Still more specifically the invention relates to apparatus for loading or supplying the receiving pocket or orifice of a vacuum chuck with metallic member such as an insert or pin which is to be thereafter handled by such chuck in any desired manner.

There is disclosed, for example, in Letters Patent of the United States 2,949,702, issued August 23, 1960 to W. S. Blanding et al., apparatus for inserting metal inserts into the inner sidewall of a glass panel intended to serve as the viewing screen for an all-glass television picture tube, such as a color television picture tube wherein an aperture mask or the like must be held with the cavity of the viewing screen. In the apparatus of such patent a plurality of burners are employed, each such burner having a metallic insert or member receiving pocket surrounded by gaseous fuel outlets for directing flames toward a metallic member manually inserted into such pocket and also toward an adjacent panel wall surface into which said member is to be inserted. It will be apparent that the manual loading of said metallic members into said burners is a relatively slow process, and that such burners become heated to a substantial degree and, therefore, provide a potential danger of burning an operator's fingers.

Accordingly, one object of the present invention is to provide apparatus for automatically loading a vacuum chuck which chuck may be similar to the burner shown in FIG. 7 of the Blanding et al. patent but which, being a vacuum chuck, is not identical thereto.

Other objects and characteristic features of the invention will become apparent as the description proceeds.

Although the present invention is described as applicable to the apparatus shown in the Blanding et al. patent, it is to be understood that it is not intended that the invention be confined to use only with the apparatus of such patent but may be used with other types of apparatus employing vacuum chucks.

In accomplishing the above described and other objects of the invention, there is provided a crank arm which is reciprocatively power actuated through a predetermined arc of travel between a metallic member or insert receiving position and a vacuum chuck member loading position, such crank arm having a recess therein which receives one of a succession of metallic members from a conveying chute each time the arm is actuated to its receiving position and in which recess each such member is carried to the chuck loading position as the arm is actuated to that position.

The invention will best be understood by reference to the accompanying drawings in which:

FIG. 1 comprises a plan view of the apparatus;

Similar reference characters refer to similar parts in each of the drawings.

Figure 1:
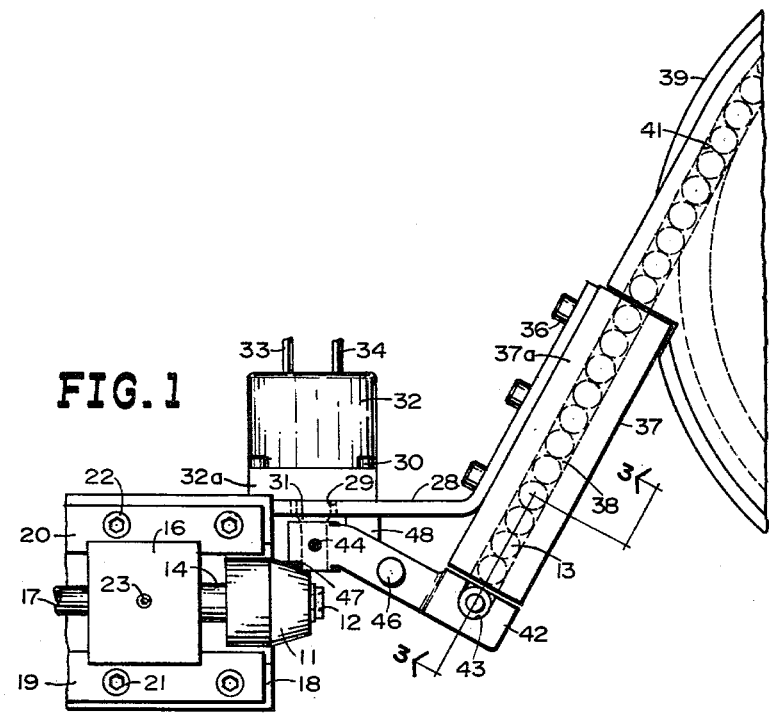
Figure 2:
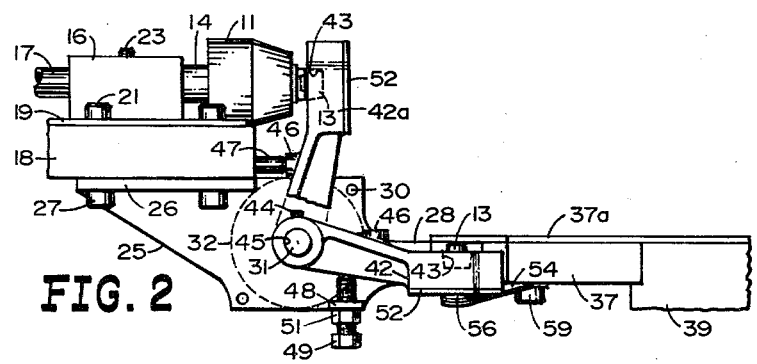
FIG. 2 is a side elevational view of the apparatus shown in FIG. 1.

Referring to FIGS. 1 and 2 of the drawings, there is shown a vacuum head or chuck 11 provided with an orifice 12 adapted to receive the tapered end portion of a metallic member such as an insert or pin 13 which is to be provided to such orifice. The chuck 11 is supported by a hollow neck portion 14 which extends through the chuck 11 to the orifice 12 and which in turn is supported by a supporting block 16. Block 16 is provided with a pipe or conduit 17 which connects with the hollow in the neck portion. By such arrangement it will be apparent that negative pressure or vacuum supplied to conduit 17 will in turn be supplied to the orifice 12 of chuck 11.

Block 16 is slidably mounted in a base plate 18 and retained therein by plates 19 and 20 secured to base plate 18 by bolts such as 21 and 22. The neck portion 14 of chuck 11 is adjustable within block 16 and is held in the place to which it is adjusted by means of a set screw 23 threaded into a cooperating hole provided in the top of block 16. The apparatus thus far described is similar to that shown in FIG. 7 of the aforementioned Blanding et al. patent except the chuck of the present invention is a vacuum chuck. If the apparatus of the present invention is to be used in conjunction with apparatus such as shown and described in said patent, the chuck 11 can be provided with gaseous fuel outlets such as shown in FIG. 7 of such patent.

Figure 3:
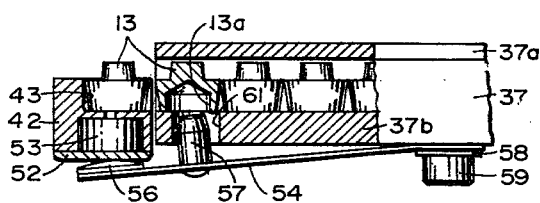
FIG. 3 is a side elevational view partially in cross-section and taken generally along line 3–3 of FIG. 1.

A support 25 having a portion 26 extending at right angles therefrom is secured to the bottom of the base plate 18 by bolts such as 27 which extend through portion 26 of support 25 and are threaded into the bottom of plate 18. Support 25 further includes an extended portion 28, the end of which is offset at a predetermined angle as shown in FIG. 1 of the drawings and which is employed as hereinafter discussed. A reciprocatory motor means 32 having a flange portion 32a and a rotary driven shaft 31 is mounted on support 25 by bolts such as 30 threaded into such support. The shaft 31 of the motor means extends through a hole 29 provided in support 25, and an offset crank arm 42, having at one end a hole 45 extending through such end of the crank and an inner diameter matching the outer diameter of said shaft, is fitted on said shaft and secured thereto by means of a set screw 44 which extends into a keyway (not shown) provided in the outer perimeter of said shaft. The end of crank arm 42 opposite the end secured to said shaft is provided with a recess 43 adapted to receive therein one of the inserts or pins such as 13 and as best illustrated in FIG. 3 of the drawings. The crank arm 42 is provided with such offset and the motor means 32 is mounted on support 25, so that, when the crank arm is actuated in the manner hereinafter described to the position indicated at 42a (FIG. 2) an opening leading to recess 43 in crank arm 42 faces the orifice 12 in chuck 11 so that the end of a button 13 contained in such recess is inserted into the pocket or orifice 12 in chuck 11. For a purpose which will become readily apparent hereafter, crank arm 42 is preferably, but need not necessarily be, made of a non-magnetic material.

The reciprocatory motor means 32 may be electrically actuated, actuated by fluid under pressure or by any other known means, the shaft 31 of the motor means being reciprocatively actuable through a predetermined arc of travel, such arc being illustrated in FIG. 2 of the drawings as an approximately ninety degree arc. Motor means 32 may, for example, be the pressurized fluid powered reciprocating torque actuator Model S-125-2V illustrated and described in Bulletin 266,013 published by the Ex-Cell-O (XLO) Corporation, 945 East Sater Street, Greenville, Ohio. Said motor means is illustrated in FIG. 1 as being such a fluid powered actuator. However, it is to be understood that any other type of reciprocating torque actuator having a shaft actuable through the desired arc of travel may be used for the motor means 32. Fluid conduits or pipes 33 and 34 (FIG. 1) are connected to ports in the motor means or actuator 32, and supply fluid under pressure to such actuator to drive the shaft thereof clockwise or counter-clockwise accordingly as said fluid pressure is supplied to the actuator through conduit 33 or 34, respectively. The supply of fluid pressure to conduits 33 or 34 may be controlled by any suitable type of control valve, such valves being well known in the art and, for purposes of simplification of the drawings, not being shown therein. Such valve may, for example, be a manually, electrically or mechanically actuated valve.

As best illustrated in FIG. 1, an insert or pin conveying chute 37 is secured by bolts, such as 36, to the offset portion of the extension 28 of support 25, such chute including an open-ended runway 38 through which the pins such as 13 are conveyed. The offset portion of extension 28 is so offset and the chute 37 is so secured thereto that a second opening, leading to the recess 43 in crank arm 42 and in the side of such arm, faces the pin issuance end of the runway in said chute when crank arm 42 is in the lower position illustrated in FIG. 2 of the drawings. The pin receiving end of the runway in chute 37 is illustrated in FIG. 1 as abutting the pin issuance end of the trough or runway 41 of a reciprocating conveyor or vibratory feeder 39, such conveyors being well known, and each pin 13 in chute 37 is continuously being pushed by the pin behind as will be readily understood by those skilled in the art. It will be readily apparent, however, that a vibratory feeder such as 39 need not necessarily be employed for conveying pins 13 to chute 37, but that the pin receiving end of such chute may be sufficiently extended and may gradually curve upward to provide a sufficient slope so that each pin is conveyed to the issuance end of the chute by the force of gravity acting on the pins behind, the pins then being manually loaded in the chute, for example.

As best understood by reference to FIG. 3 of the drawings, a magnet 53 is provided in crank arm 42, adjacent the back wall forming the recess 43 in such crank arm and is retained in such crank arm by a back plate 52 affixed to said crank arm in any convenient manner, such back plate being preferably made of a non-magnetic material and readily removable for replacement of the magnet 53 if found necessary. During an actuation of crank arm 42 from the pin receiving position to the position of insertion of the end of the pin into the orifice 12 in chuck 11, as hereinafter discussed, magnet 53 serves to retain within recess 43 a pin 13 supplied to such recess.

It is pointed out that chute 37 is provided with a cover 37a which prevents the pins 13 in the runway of the chute from being forced upward and out of the runway by the force exerted on each such pin by the pins behind. In addition, chute 37 is provided with a gating means which permits the issuance of a pin from the issuance end of the chute only when the side opening in crank arm 42 leading to recess 43 in such arm faces such end of the chute. This gating means will best be understood by reference to FIG. 3 of the drawings wherein there is shown a leaf spring 54 attached at its one end to the bottom portion 37b of chute 37 by a washer 58 and bolt 59, such bolt being screwed into said bottom portion of the chute 37. The leaf spring extends coextensively along the length of and beyond the bottom of the pin issuance end of the chute and is tensioned to normally be substantially retained against such bottom. The end of the spring 54 extending beyond the bottom of the chute is provided with a contact button 56 with which contact is made by the bottom plate 52 of crank arm 42 when such crank arm is in its lower position as illustrated in FIG. 2 as well as FIG. 3 of the drawings. Spring 54 is further provided intermediate its ends and on its upper surface with a projection 57 securely attached to said spring as by riveting, for example. Such projection 57 projects or extends upward through a hole 61 provided in the bottom portion 37b of chute 37 and, when crank arm 42 is in other than its lower position, the resiliency of spring 54 forces the projection 57 upward into the cup-shaped cavity 13a of the next pin to be issued from chute 37, such cavity conveniently existing in pins 13 employed as illustrative of the invention. Said pin 13 is thereby retained in chute 37 until crank arm 42 is in its lower position. It will be readily apparent to those skilled in the art that, if the metallic members such as 13 do not conveniently include a cavity such as 13a, a projection, similar to projection 57 but flat and thin, can be so disposed on spring 54 as to be forced upward by said spring in front of the next pin to be issued from the chute 37 and thereby retain such pin in the chute until crank arm 42 is in its lower position.

Reciprocating torque actuators, such as 32 illustrated in the drawings, are internally provided with stops to limit the arc of travel of their actuated shafts. However, for purpose of convenience of adjustment, a first crank arm stop shown as a bolt 49 is threaded through a further extension 48 provided on support 25 and extending outwardly from the bottom thereof and at right angles thereto. Bolt 49 is so located with respect to the crank arm 42 that it limits the movement of such crank arm by contact with the web of such arm when the arm is actuated to its lower position as shown in FIG. 2. A lock nut 51 is provided on bolt 49 to lock the bolt in any position to which it is adjusted. A second crank arm stop 47 (FIG. 2) is threaded into base plate 18 and limits the arc of travel of crank arm 42 to its upper position, indicated at 42a, by contacting a bumper projection 46 provided on such crank arm.

Briefly the apparatus of the invention operates in the following described manner.

Assuming crank arm 42 to be in its normal lower position as illustrated in the drawings, leaf spring 54 (FIG. 3) has been depressed by the contact of plate 52 of arm 42, and a pin or insert 13 has been issued from the issuance end of runway 38 in chute 37 and into the recess 43 in arm 42 by the force supplied to such pin by the succession of pins therebehind, as previously mentioned. Pressurized fluid is now supplied through conduit 34 to the torque 32, conduit 33 being opened to exhaust, and shaft 31 of the actuator and crank 42 are rotated counter-clockwise through a ninety degree arc to the position of the arm illustrated at 42a, the pin 13 carried by the crank arm being retained in the recess 43 in such arm by magnet 53 during the movement of the arm through said arc of travel, and the end of such pin being inserted into the orifice 12 of chuck 11 at the upper end of such arc of travel. Negative pressure or vacuum may be continuously supplied by means of conduit 17 to orifice 12 of chuck 11 but, more economically and conveniently, such pressure may be supplied to conduit 17 and orifice 12 for a predetermined period following the insertion of the pin 13 into such orifice. The valve means for supplying such pressure to conduit 17 are not shown in the drawings for purpose of simplification thereof, such valve means per se forming no part of the present invention and being well known.

Following the insertion of the end of a pin 13 in the orifice 12 of said chuck pressurized fluid is supplied to conduit 33 connecting to actuator 32 and conduit 34 is opened to exhaust. Shaft 31 and crank arm 42 are thereby rotated clockwise to their normal positions illustrated in the drawings, pin 13 being drawn away from the attraction of magnet 53 and out of recess 43 by the vacuum of orifice 12 when arm 42 leaves its upper position. The end of pin 13 is thereafter temporarily retained in orifice 12 of chuck 11 until the pin is handled by the chuck and its operating mechanism in the manner desired. In the aforesaid patent to Blanding et al., for example, such handling is the insertion of the pin into the interior sidewall of a skirted viewing panel for a television picture tube as illustrated in FIGS. 7 and 8 of the drawings of such patent.

It will be noted by reference to FIG. 3, that, as crank arm 42 leaves its lower position as discussed above, the projection 57 on leaf spring 54 is actuated by such leaf spring into the cup-shaped cavity 13a within the bottom of the pin 13 next to be issued from the runway 38 in chute 37 and such pin is, therefore, prevented from issuing from the runway at such time. As crank arm 42 approaches its lower position, upon its return thereto as discussed above, the plate 52 on the bottom of such arm contacts the contact button 56 on leaf spring 54 and progressively depresses such button and leaf spring as the crank arm continues toward the lower limit of its arc of rotation. Such depression of the spring 54 withdraws projection 57 from the cavity 13a in the bottom of the next pin to be issued from the runway 38 in chute 37 and, when recess 43 faces the issuance end of the chute runway in such a position as to receive the next pin to be issued, projection 57 is completely withdrawn from the cavity in such pin to permit issuance of the pin from the chute runway and into said recess. Following the issuances of such pin into the recess 43 in crank arm 42, the crank arm is ready for actuation to carry and insert the pin into the orifice 12 in chuck 11 in the same manner as discussed above.

It will be apparent to those skilled in the art that within the scope of the present invention numerous forms of gating means, other than that shown and described herein, may be employed for retaining the metallic members 13 within the runway 38 of chute 37 during the period that crank arm 42 is in other than its normal lower position.

Although there is herein shown and described only one specific embodiment of the apparatus comprising the invention, it is to be understood that various changes and modifications may be made therein without departing from the spirit and scope of the appended claims.

What is claimed is:

1. Apparatus for individually inserting each of a plurality of identical metallic pins into the receiving orifice of a vacuum chuck, said apparatus comprising, a power torque actuator having a shaft reciprocatory between first and second limits of a predetermined arc of travel, a crank arm affixed at its one end to said shaft and provided at its other end with a recess for receipt therein of one of said metallic pins, a support mounting said actuator so that the recess in said crank arm faces the orifice in said chuck when the shaft of the actuator reaches said first limit of its arc of travel, a pin conveying chute containing said plurality of pins and having an open delivery end disposed to face the recess in said crank arm when the shaft of said actuator reaches said second limit of its arc of travel, a gating device normally preventing issuance of sid pins from said chute and actuable by said crank arm to permit the issuance of a pin in a predetermined position in the recess in such arm when such recess faces said delivery end of the chute, and a magnet disposed adjacent one of the walls forming said recess for temporarily retaining therein in said predetermined position a pin issued thereto.

2. Apparatus in accordance with claim 1 and in which said torque actuator is operated by fluid under pressure.

3. Apparatus in accordance with claim 1 and in which said gating device comprises a leaf spring contacted by said crank arm as said shaft approaches said second limit of its arc of travel.

4. In combination, a vacuum chuck supported in a predetermined position, motor means including a shaft reciprocatory through a predetermined arc of travel, a crank arm affixed at its one end to said shaft and provided at its other end with a metallic member receiving recess, a magnet adjacent at least a part of one of the walls of said recess, a support mounting said motor means so that said recess faces said chuck when said shaft is at one end of its said arc of travel, a metallic member conveying chute containing a succession of said members and having an open delivery end disposed so as to face the recess in said crank arm when said shaft is at the end of its arc of travel opposite said one end of such arc, and gating means permitting the issuance of a metallic member from the delivery end of said chute only when said shaft is at said opposite end of its arc of travel such gating means actuable by said crank arm.

5. Apparatus in accordance with claim 4 and in which said motor means comprises a fluid operated torque actuator.

6. Apparatus in accordance with claim 4 and in which said gating means comprises a leaf spring.

7. Apparatus for loading a metallic member into a member receiving orifice in a vacuum chuck, said apparatus comprising, loading means provided with a recess actuable between a metallic member receiving position and a chuck loading position, motor means for at times reciprocating said loading means between said positions, a chute at said receiving position for successively supplying each of a plurality of metallic members to said recess each such member being supplied to such recess in such a position that it is readily insertable by said loading means into said orifice, and magnetic means for retaining in said recess during the actuation of said loading means from said receiving position to said loading position each said metallic member supplied to such recess.

8. Apparatus according to claim 7 and in which said motor means comprises a fluid actuated motor.

References Cited by the Examiner

UNITED STATES PATENTS

| 1,350,405 | 8/20 | Gaynor | 221—212 |
| 1,949,960 | 3/34 | Franzen et al. | 221—212 |
| 2,604,577 | 7/52 | Strickland et al. | 221—290 |
| 2,949,702 | 8/60 | Blanding et al. | 65—41 |

RAPHAEL M. LUPO, *Primary Examiner.*